United States Patent [19]
Gipson et al.

[11] Patent Number: 4,749,191
[45] Date of Patent: Jun. 7, 1988

[54] ANTI-SLIP STEP AND METHOD OF MANUFACTURE

[75] Inventors: Carl L. Gipson, Columbia City; Kjell Pedersen, Ft. Wayne, both of Ind.; David H. Townsend, Springfield, Ohio

[73] Assignee: Navistar International Transportation Corp., Chicago, Ill.

[21] Appl. No.: 13,601

[22] Filed: Feb. 12, 1987

[51] Int. Cl.$^4$ .............................................. B60R 3/04
[52] U.S. Cl. ................... 280/164 A; 52/179; 280/169
[58] Field of Search ............ 280/169, 163, 164 A; 182/194; 52/179; 180/90.6; 296/75

[56] References Cited

U.S. PATENT DOCUMENTS

| | | | |
|---|---|---|---|
| 954,893 | 4/1910 | Simpson | 52/179 |
| 1,413,265 | 4/1922 | Dodge | 280/164 A |
| 1,463,359 | 7/1923 | Erskine | 280/164 A |
| 1,484,877 | 2/1924 | Erkler | 280/164 A |
| 1,578,491 | 3/1926 | Welcome | 52/179 |
| 1,667,040 | 4/1928 | Larkin | 52/179 |
| 1,693,399 | 11/1928 | Nagin | 52/179 |
| 2,135,837 | 11/1938 | Pattison | 52/179 |
| 2,501,819 | 3/1950 | Kloepper | 180/309 |
| 3,057,271 | 10/1962 | Butler et al. | 52/179 |
| 3,181,440 | 5/1965 | Mullaney et al. | 105/457 |
| 3,744,204 | 7/1973 | Eshler | 52/671 |
| 4,203,611 | 5/1980 | Makela | 280/163 |
| 4,257,620 | 3/1981 | Okland | 280/153 R |
| 4,400,002 | 8/1983 | Stillmunks | 280/164 A |
| 4,463,962 | 8/1984 | Snyder | 280/164 R |

Primary Examiner—Richard A. Bertsch
Attorney, Agent, or Firm—F. David Aubuchon; Dennis K. Sullivan

[57] ABSTRACT

An anti-slip step having a plate member providing a tread surface portion and having an integrally formed down-turned vertical edge extending along a side, the intersection between the tread surface portion and the vertical edge being a curved surface blending into both the tread surface portion and the vertical edge. A plurality of discrete raised tabs are integrally formed as a continuation of the vertical edge and project above the curved surface. A plurality of discrete vertical apertures are open through the plate and disposed in the tread surface portion adjoining the rear and sides of each of the raised tabs. The area of an aperture is substantially larger than the vertical surface area of the respective tabs.

13 Claims, 1 Drawing Sheet

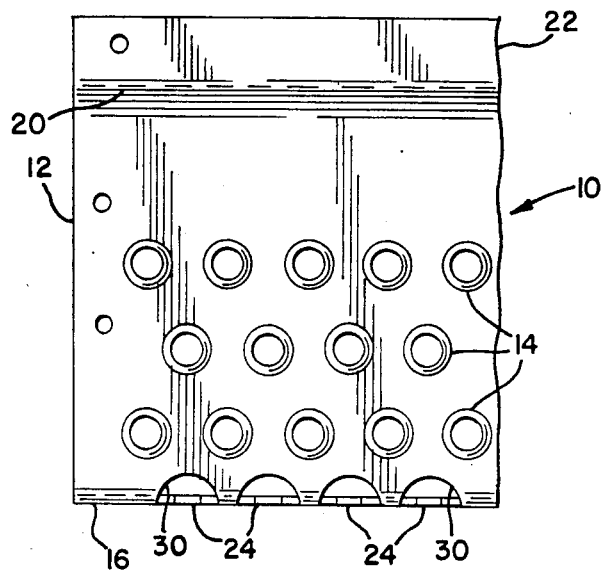
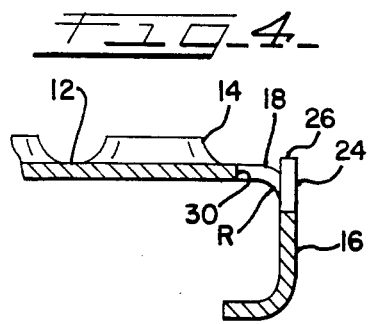
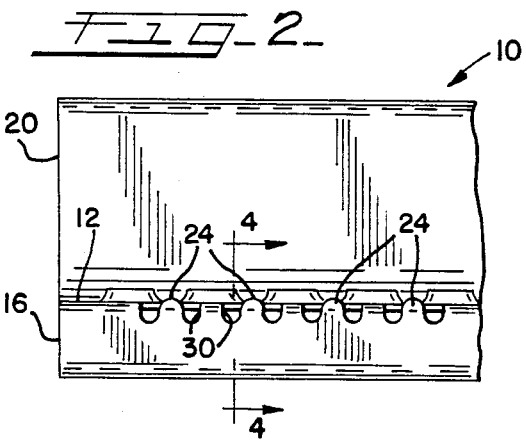
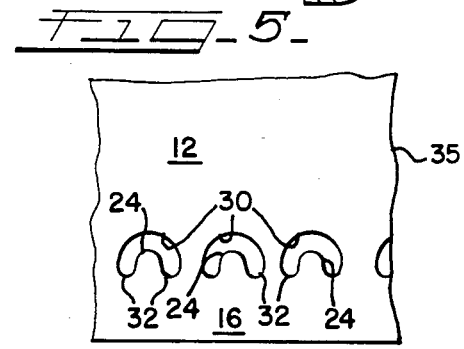
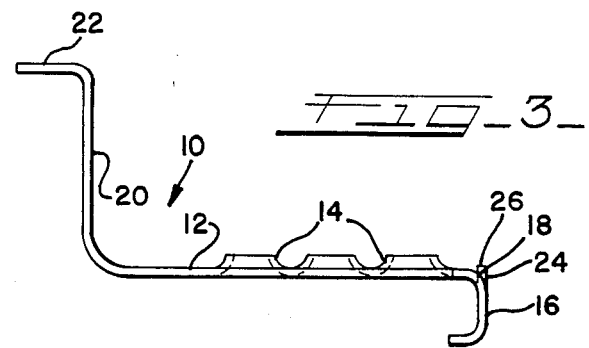

ANTI-SLIP STEP AND METHOD OF MANUFACTURE

This invention relates to steps or tread plates, such as those used on medium and heavy duty trucks to facilitate entry of the operator into the operator's cab, and, more particularly, to a step providing tabs on the, corner of the tread surface for gripping the bottom of shoes to prevent slippage on the corner and to a method of manfacturing the step.

THE PRIOR ART

It is previously known to provide raised tabs on the corner of a tread plate, as shown in Mullaney et al. U.S. Pat. No. 3,181,440. In the Mullaney patent, the tread plate has a rounded corrugation or corner extending into a vertical edge and the corner is lanced and the lanced portions are punched outwardly and upwardly to form a series of tab-like gripping edges. There are, however, difficulties with the design and method of manufacture of the Mullaney device. One is that the tabs shown in the Mullaney patent overlap the material thickness of the corrugation or corner, thus making it possible for debris, such as ice or mud from shoe bottoms, to collect in between the tab and or corner of the tread plate which may render the tabs substantially less effective than desired. Another difficulty is that the tabs are formed with a sharp edge. Although this may promote gripping, the sharp edge could be harmful if one nevertheless slipped.

SUMMARY OF THE INVENTION

In the present invention, these difficulties are solved by providing a vertically open aperture adjoining the tab which will allow debris to be expelled through the tread surface and reduce its tendency to accumulate and by the manufacturing method wherein the aperture is first stamped in the tread surface prior to bending. Bending the step plate at right angles through the aperture to form a tread surface and a vertical edge will result in an unbent tab remaining as a continuation of the vertical edge raised from the arcuate bend surface which will have a horizontal top edge as a result of the aperture being formed prior to bending.

Accordingly, it is an object of the invention described herein to provide an anti-slip step having raised tabs on the corner of the step which would be commonly contacted by the shoe of one ascending the step.

It is further an object of the invention to provide the step with apertures behind the tabs for permitting the escape of debris accumulating between the tabs and the step surface.

A more specific object of the invention described herein is to provide the apertures with a greatly enlarged periphery relative to the size of the tabs.

Yet another specific object of the invention is described herein is to provide the upper surface of the tabs with a horizontal surface when the step is in its useful position.

Another object of the invention is to provide a process for manufacturing the step wherein the tabs are formed by bending the step.

A further object of the invention is to provide in the process for forming the periphery of the apertures in the step prior to bending the step to form the raised tabs.

Yet another object of the invention is provide in the process to form the periphery of the apertures substantially larger than the periphery of the tabs.

Still another object of the invention is to provide a process wherein the step plate is bent along a line extending through a plurality of apertures adjacently disposed on the plate.

DETAILED DESCRIPTION OF THE DRAWINGS

Other objects and advantages of the invention will become more apparent upon a perusal of the detailed description thereof and upon reference to the drawings in which:

FIG. 1 is a plan view of a portion of a step incorporating and made in accordance with the present invention;

FIG. 2 is a front elevation of the step of FIG. 1;

FIG. 3 is a side elevation of the step of FIG. 1;

FIG. 4 is a side sectional view of the step of FIG. 2 taken along the line 4—4 thereof; and FIG. 5 is a plan view of a portion of a step plate prior to being bent to form the raised tabs shown in FIGS. 1-4.

DETAILED DESCRIPTION OF THE PREFERRED EMBODIMENT

In the following description and claims, the terms "vertical" and "horizontal" and "front" and "rear" are intended to reflect the relative positions of elements of the step in normal use with the observer facing the step from the bottom and are not intended to otherwise limit the invention.

Referring to the drawings, there is shown in FIGS. 1-4, a metal step generally designated 10 of the type which might be positioned, for example, to assist an operator to enter the cab of a heavy duty truck. The step 10 includes a horizontal tread surface portion 12 of substantial width in which a plurality of raised tread elements 14 are formed. The specific design of the raised tread elements is beyond the scope of the invention. Integrally formed as a downturned continuation of the tread surface portion 12 on the front side thereof is a vertical edge portion 16 which forms a nose of the step 10. As is customary, the intersection of the tread surface portion 12 and vertical edge portion 16 is formed as an arcuate surface 18 of suitable radius blending respectively into both the tread surface and the vertical edge. The step 10 further includes on integrally formed rearward riser portion 20 which may lead to upper flange 22, as shown, for mounting purposes, or which itself may be a vertical edge portion (not shown) leading to another tread surface portion in the case of a multiple step device.

In accordance with the invention, a plurality of raised tabs 24 are formed as a integral vertically extending continuation of vertical edge 16. The tabs 24 extend laterally across the width of the step 10 and are intended to aggressively engage the bottom of a shoe positioned on the corner of the step and prevent slippage of a shoe engaging only the corner. The tabs 24 extend above the arcuate surface 18 formed at the intersection of tread surface portion 12 and vertical edge 16 to a distal end 26 disposed at a level between the top of the tread surface portion 12 and the top of the raised tread elements 14. The distal ends 26 are further horizontal from front to back or across the thickness of the material but may be rounded in the transverse plane.

Disposed adjacent to or adjoining each of the raised tabs 24 on the rearward side thereof is an aperture 30 extending through the tread surface portion 12. As best shown in FIG. 5, which is an unbent plate, the apertures 30 preferably are substantially larger than the tabs 24 to permit debris such as mud, ice, snow, and other residue which might accumulate on the step or on the bottom of a shoe to fall through the aperture and thus reduce the likelihood of the shoe of an operator ascending the step slipping off the corner thereof. In the unbent state, the apertures 30 are U-shaped, opening away from the tread surface portion 12, the inner periphery of the U-shaped defining the tabs 24.

The step 10 is manufactured by first forming a linearly adjacently disposed array of U-shaped apertures 30 in unbent plate 35, as shown in FIG. 5, with the tabs 24 defined by the U-shape being parallel and the opening of the U-shape being away from the intended tread plate surface 12. With the apertures 30 thus formed, as by stamping, the plate 35 is then bent along a line perpendicular to the legs 32 of the U-shaped portion, without bending the tabs 24, until the tread plate portion 12 is at approximately a 90° angle to the vertical edge portion 16. Preferably, the bend radius will begin at the distal ends of the legs 32 of the U-shaped apertures and will be so sized that the distal ends 26 of the tabs 24 will be at a level above the tread plate. Thus, the unbent tabs 24 will remain an integral extension of the vertical edge 16 and extend beyond the arcuate surface 18 formed by the bend radius. Additionally, since the apertures 30 are formed preferably with walls perpendicular to plate 35 in the unbent state, the distal ends 26 of tabs 24 will remain perpendicular to the thickness of the material or horizontal thereacross in the useful position of the step. The tread elements 14 may be formed on the tread plate surface 12 either before or after the bending step but preferably before since the tread elements 14 and apertures 30 as well as mounting holes can all be stamped or punched in one operation.

Thus, there has been described, in accordance with the invention, an anti-slip step which fully meets the objects, aims, and advantages set forth above. It is recognized that those of ordinary skill in the art reading this description may recognize that alternatives and modifications are possible without departing from the true scope of the invention. Accordingly, it is intended to cover all such modifications as may fall within the true scope of the appended claims.

What is claimed is:

1. An anti-slip step comprising: a plate member providing a tread surface portion and having an integrally formed downturned vertical edge extending along a side thereof, the intersection between said tread surface portion and said vertical edge being a curved surface blending into both said tread surface portion and said vertical edge;
   a plurality of discrete raised tabs integrally formed as a continuation of said vertical edge and projecting above said curved surface; and,
   a plurality of discrete vertical apertures open through said plate respectively disposed in said tread surface portion adjoining the rear and sides of each of said raised tabs, the area of an aperture being substantially larger than the vertical surface area of its respective tab.

2. The invention in accordance with claim 1 and said tabs extending at least even with said tread surface portion.

3. The invention in accordance with claim 2 and said tabs extending above said tread suface portion.

4. The invention in accordance with claim 1 and said tabs having a horizontal top surface across the thickness thereof.

5. The invention in accordance with claim 1 and said tread surface having raised tread elements disposed thereon.

6. The invention in accordance with claim 5 and the upper edges of said tabs being disposed above said tread surface portion and below said raised tread elements.

7. An anti-slip step comprising:
   a plate member providing a tread surface and having an integrally formed downturned vertical edge edtending along a side thereof, the intersection of said tread surface and said vertical edge being an arcuate surface smoothly blending respectively into said tread surface and into said vertical edge;
   a plurality of discrete raised tabs integrally forming a vertical continuation of said vertical edge beyond said arcuate surface; and
   a plurality of discrete apertures disposed in said tread surface, each of said apertures respectively adjoining the rear and sides of each of said raised tabs, said apertures being vertically open through said plate sufficiently to reduce the accumulation of debris between said tabs and said tread surface.

8. The invention in accordance with claim 7 and a plurality of raised tread elements disposed on said tread surface.

9. The invention in acordance with claim 8 and said tabs extending above said tread surface and below the top of said raised tread elements.

10. A method of manufacturing an anti-slip step comprising the sequential steps of:
    forming a plurality of U-shaped apertures having leg portions defining a tab in a tread surface plate and an outer periphery substantially larger than the periphery of said tab, said U-shaped apertures being adjacently linearly disposed with the tabs parallel; and
    bending said plate about 90°, the bend line passing perpendicularly through said U-shaped apertures such that the tabs form an integral continuation of a first bent portion of said plate.

11. The invention in accordance with claim 10 and further comprising bending said plate with the bend radius beginning at the distal ends of the leg portions of said U-shaped apertures.

12. The invention in accordance with claim 11 further comprising forming tread elements in a portion of said bent plate other than said first bent portion.

13. The invention in accordance with claim 10 and forming said apertures to produce an edge on said tabs substantially perpendicular to the thickness of the material.

* * * * *